US008479095B2

(12) United States Patent
Nagamine et al.

(10) Patent No.: US 8,479,095 B2
(45) Date of Patent: Jul. 2, 2013

(54) WORKFLOW EXECUTING DEVICE, PREVIEW CREATING METHOD

(75) Inventors: Shoh Nagamine, Kanagawa (JP); Hiroki Ozaki, Kanagawa (JP); Hiroshi Baba, Kanagawa (JP); Masateru Kumagai, Kanagawa (JP); Shinsuke Yanazume, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/200,342

(22) Filed: Sep. 23, 2011

(65) Prior Publication Data

US 2012/0096348 A1 Apr. 19, 2012

(30) Foreign Application Priority Data

Oct. 19, 2010 (JP) .................................. 2010-234869

(51) Int. Cl.
*G06F 17/00* (2006.01)
(52) U.S. Cl.
USPC .......................................................... 715/273
(58) Field of Classification Search
USPC .......................................... 715/273, 274, 243
See application file for complete search history.

(56) References Cited

U.S. PATENT DOCUMENTS

| | | | | |
|---|---|---|---|---|
| 6,239,882 B1 * | 5/2001 | De Mangelaere et al. | ..... | 358/474 |
| 6,980,332 B2 * | 12/2005 | Simske | .......................... | 358/445 |
| 7,639,857 B2 * | 12/2009 | Nonaka | ......................... | 382/134 |
| 7,747,951 B2 * | 6/2010 | Croft | ............................. | 715/276 |
| 7,760,405 B2 * | 7/2010 | Ricard | ........................... | 358/517 |
| 7,797,638 B2 * | 9/2010 | Dev Sareen et al. | .......... | 715/772 |
| 2003/0117639 A1 * | 6/2003 | Milton et al. | ................. | 358/1.13 |
| 2004/0008369 A1 * | 1/2004 | Keane et al. | .................. | 358/1.15 |
| 2005/0105129 A1 * | 5/2005 | Takahashi | .................... | 358/1.15 |
| 2005/0204278 A1 * | 9/2005 | Garcia et al. | .................. | 715/502 |
| 2005/0268230 A1 * | 12/2005 | Bales | ............................ | 715/530 |
| 2006/0074732 A1 * | 4/2006 | Shukla et al. | ..................... | 705/8 |
| 2007/0250492 A1 * | 10/2007 | Angel et al. | ........................ | 707/4 |
| 2008/0005130 A1 * | 1/2008 | Logan et al. | ..................... | 707/10 |
| 2008/0147210 A1 * | 6/2008 | Moore et al. | ..................... | 700/58 |
| 2009/0251721 A1 * | 10/2009 | Knodt et al. | ................. | 358/1.15 |
| 2009/0300480 A1 * | 12/2009 | Cohen et al. | .................. | 715/234 |
| 2010/0011309 A1 * | 1/2010 | Mitra et al. | .................... | 715/768 |
| 2010/0070448 A1 * | 3/2010 | Omoigui | ......................... | 706/47 |
| 2010/0287529 A1 * | 11/2010 | Costa et al. | .................... | 717/105 |
| 2011/0246925 A1 * | 10/2011 | Marchand et al. | ............ | 715/772 |

FOREIGN PATENT DOCUMENTS

| | | |
|---|---|---|
| JP | 2005167988 A | 6/2005 |
| JP | 2006260304 A | 9/2006 |
| JP | 2009252249 A | 10/2009 |

* cited by examiner

*Primary Examiner* — Laurie Ries
(74) *Attorney, Agent, or Firm* — Harness, Dickey & Pierce, P.L.C.

(57) ABSTRACT

A workflow executing device includes a workflow executing unit; a first extracting unit that extracts a first preview property including a first element constituting a first data item and first position information; a second extracting unit that extracts a second preview property including a second element constituting a second data item and a second position information item, the second data item being obtained as a result of processing the first data item; a preview property managing unit that saves preview properties; a preview property generating unit that inserts the second element that is the processing result into the first preview property in place of the first element that is the processing target, and generates a new second preview property by associating the first position information with the second element; and a preview creating unit that creates preview images based on preview properties.

6 Claims, 13 Drawing Sheets

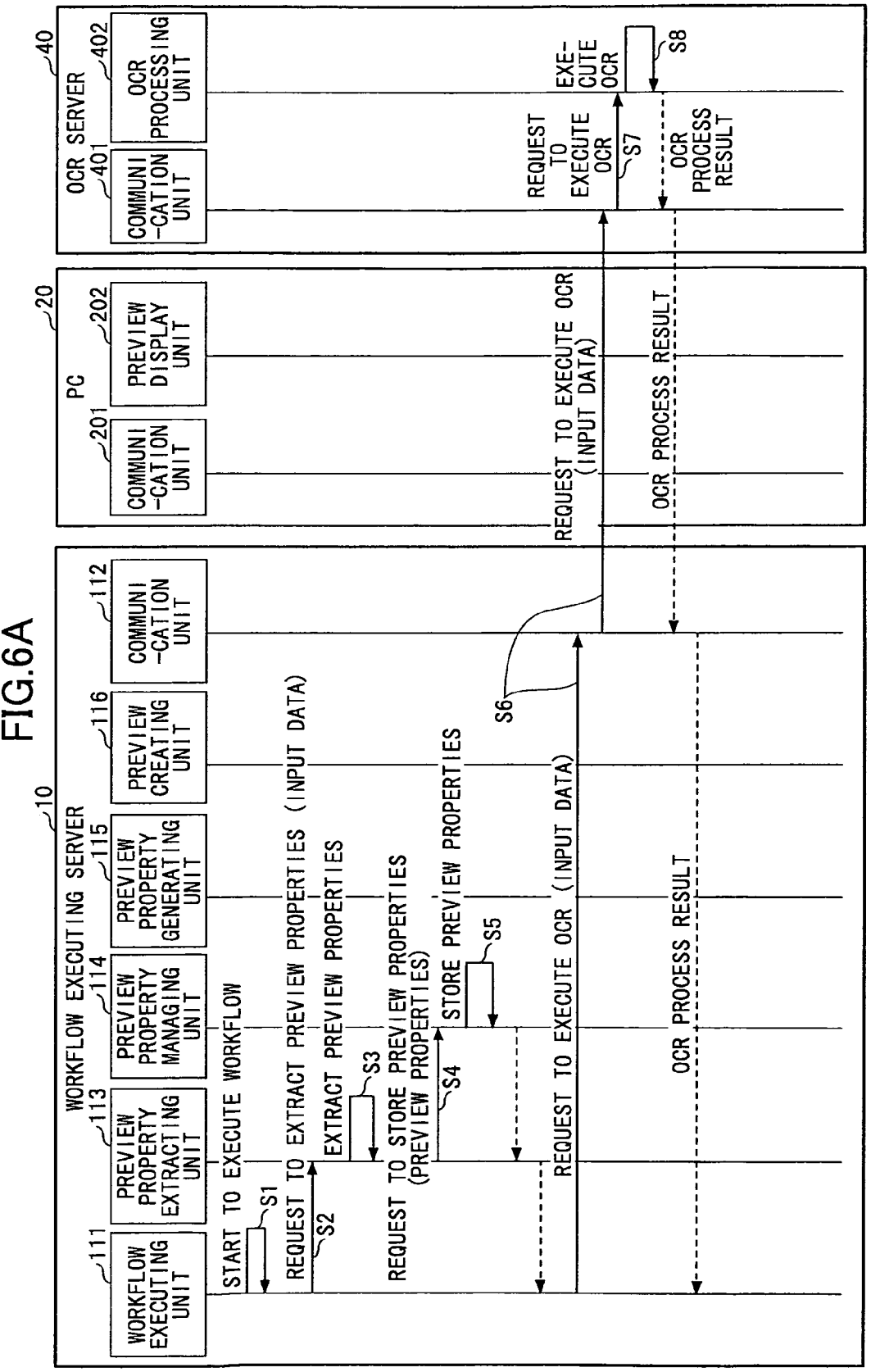

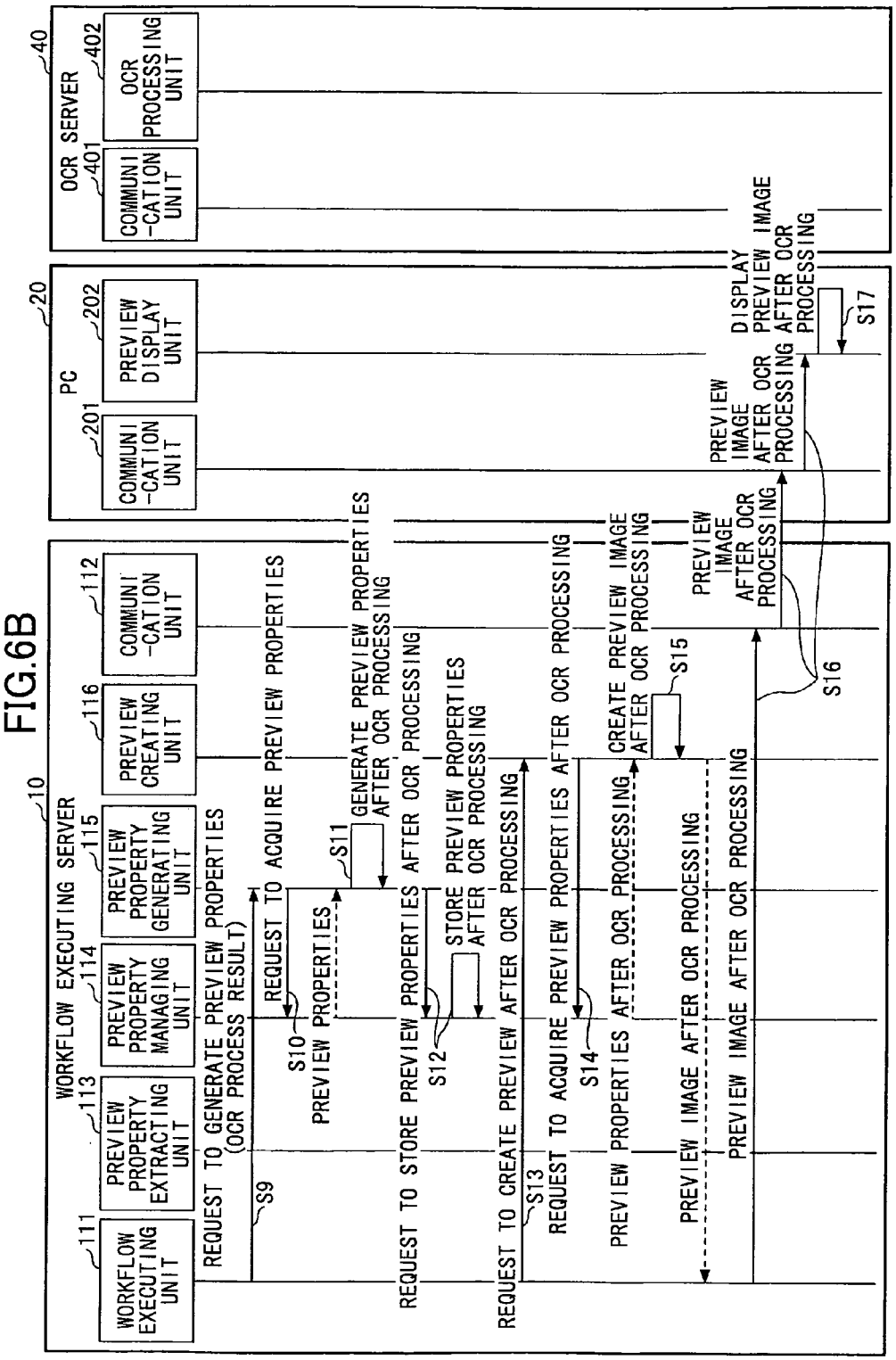

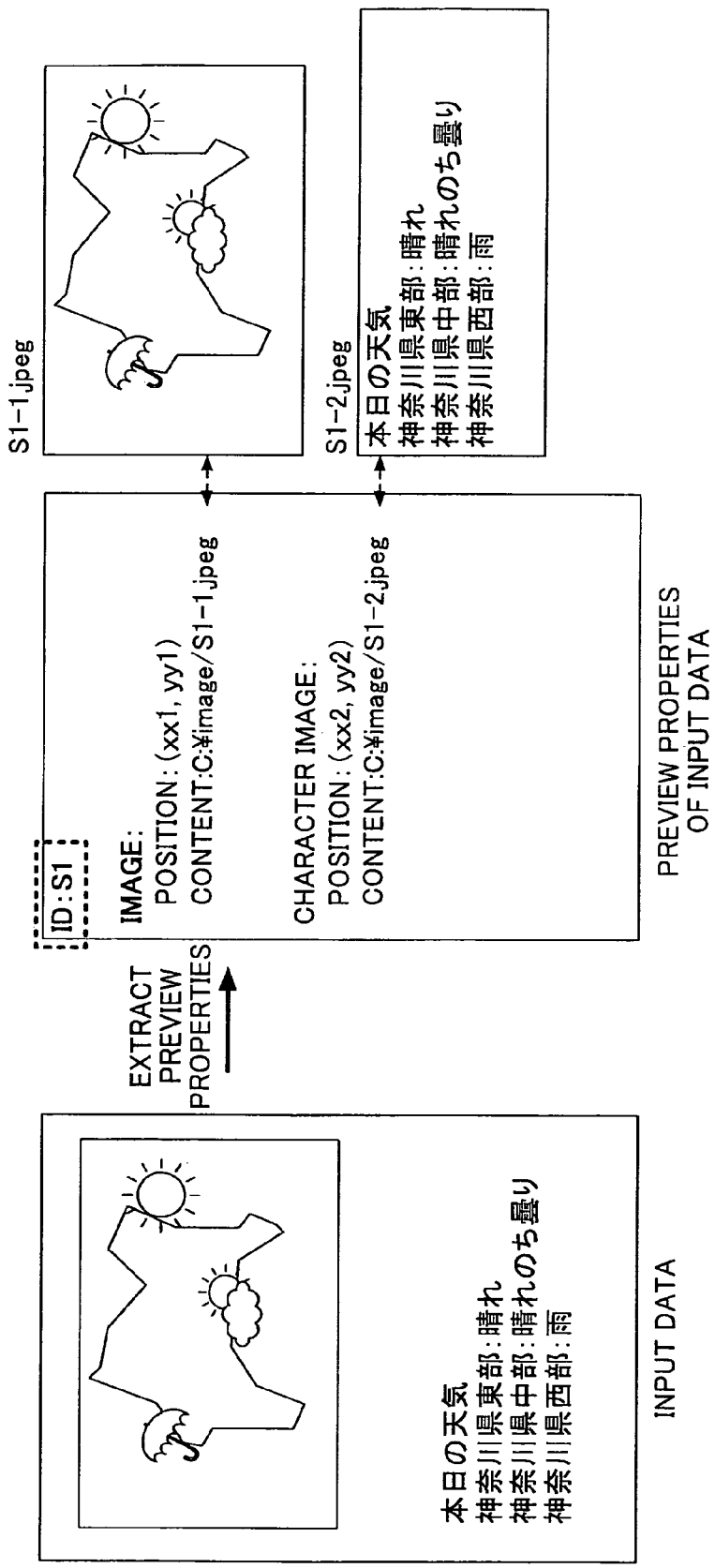

PREVIEW PROPERTIES

PREVIEW PROPERTIES OF INPUT DATA

ID:S1
IMAGE:
 POSITION: (xx1, yy1)
 CONTENT:C:¥image/S1-1.jpeg
CHARACTER IMAGE:
 POSITION: (xx2, yy2)
 CONTENT:C:¥image/S1-2.jpeg

CREATE PREVIEW PROPERTIES →

PREVIEW PROPERTIES AFTER OCR PROCESSING

ID:S2
IMAGE:
 POSITION: (xx1, yy1)
 CONTENT:C:¥image/S1-1.jpeg
CHARACTER:
 POSITION: (xx2, yy2)
 CONTENT:C:¥text/S2-1.txt S2-1.txt
本日の天気
神奈川県東部:晴れ
神奈川県中部:晴れのち曇り
神奈川県西部:雨

FIG.12

```
<preview>

<ID> S2 </ID>
<image>
  <x_coordinate> xx1 </x_coordinate>
  <y_coordinate> yy1 </y_coordinate>
  <datapath> C:¥image/S1-1.jpeg </datapath>
</image>

<strong>
<text>
  <x_coordinate> xx2 </x_coordinate>
  <y_coordinate> yy2 </y_coordinate>
  <datapath> C:¥text/S2-1.text </datapath>
</text>
</strong>

</preview>
```

WORKFLOW EXECUTING DEVICE, PREVIEW CREATING METHOD

BACKGROUND OF THE INVENTION

1. Field of the Invention

The present invention relates to a workflow executing device and a preview creating method.

2. Description of the Related Art

There is a conventional workflow executing system in which plural services provided in a network are combined together to construct and execute a workflow. In the conventional technology, with a preview function for viewing results of the service executing units provided in the network, the respective service executing units display previews by different methods (formats). A user can view the previews of process results of the respective service executing units in workflows. However, because the service executing processes are executed by the respective service executing units, the previews displayed as the execution process results may appear to be different.

SUMMARY OF THE INVENTION

The present invention provides a workflow executing device and a preview creating method, in which one or more of the above-described disadvantages are eliminated.

According to an aspect of the present invention, there is provided a workflow executing device connected to plural service providing units via a network, the workflow executing device including a workflow executing unit configured to execute a workflow including a combination of processes provided by the plural service providing units; a first preview property extracting unit configured to analyze a first data item and extract a first preview property from the first data item, the first preview property including a first element constituting the first data item and first position information of the first element; a second preview property extracting unit configured to analyze a second data item obtained as a result of the first data item being processed by the plural service providing units, and extract a second preview property from the second data item, the second preview property including a second element constituting the second data item and second position information of the second element; a preview property managing unit configured to save preview properties; a preview property generating unit configured to acquire the first preview property and the second preview property from the preview property managing unit, insert, into the first preview property in place of the first element that is a processing target of the plural service providing units, the second element obtained as a result of the first element being processed by the plural service providing units, and generate a new second preview property by associating the first position information with the second element; and a preview creating unit configured to create preview images based on preview properties.

According to an aspect of the present invention, there is provided a preview creating method performed by a workflow executing device connected to plural service providing units via a network, the workflow executing device including workflow executing unit that executes a workflow including a combination of processes provided by the plural service providing units, the preview creating method including analyzing a first data item; extracting a first preview property from the first data item, the first preview property including a first element constituting the first data item and first position information of the first element; analyzing a second data item obtained as a result of the first data item being processed by the plural service providing units; extracting a second preview property from the second data item, the second preview property including a second element constituting the second data item and second position information of the second element; saving preview properties; acquiring the first preview property and the second preview property saved at the saving; inserting, into the first preview property in place of the first element that is a processing target of the plural service providing units, the second element obtained as a result of the first element being processed by the plural service providing units; generating a new second preview property by associating the first position information with the second element; and creating preview images based on preview properties.

BRIEF DESCRIPTION OF THE DRAWINGS

Other objects, features and advantages of the present invention will become more apparent from the following detailed description when read in conjunction with the accompanying drawings, in which:

FIGS. 6A and 6B illustrate a sequence diagram for describing information processing performed by the workflow executing server according to an embodiment;

FIG. 7 illustrates the operation of extracting preview properties;

FIG. 12 illustrates a specific example of preview properties in a style sheet.

DETAILED DESCRIPTION OF THE PREFERRED EMBODIMENTS

A description is given, with reference to the accompanying drawings, of embodiments of the present invention.

System Configuration

Network Configuration

Figure 1:
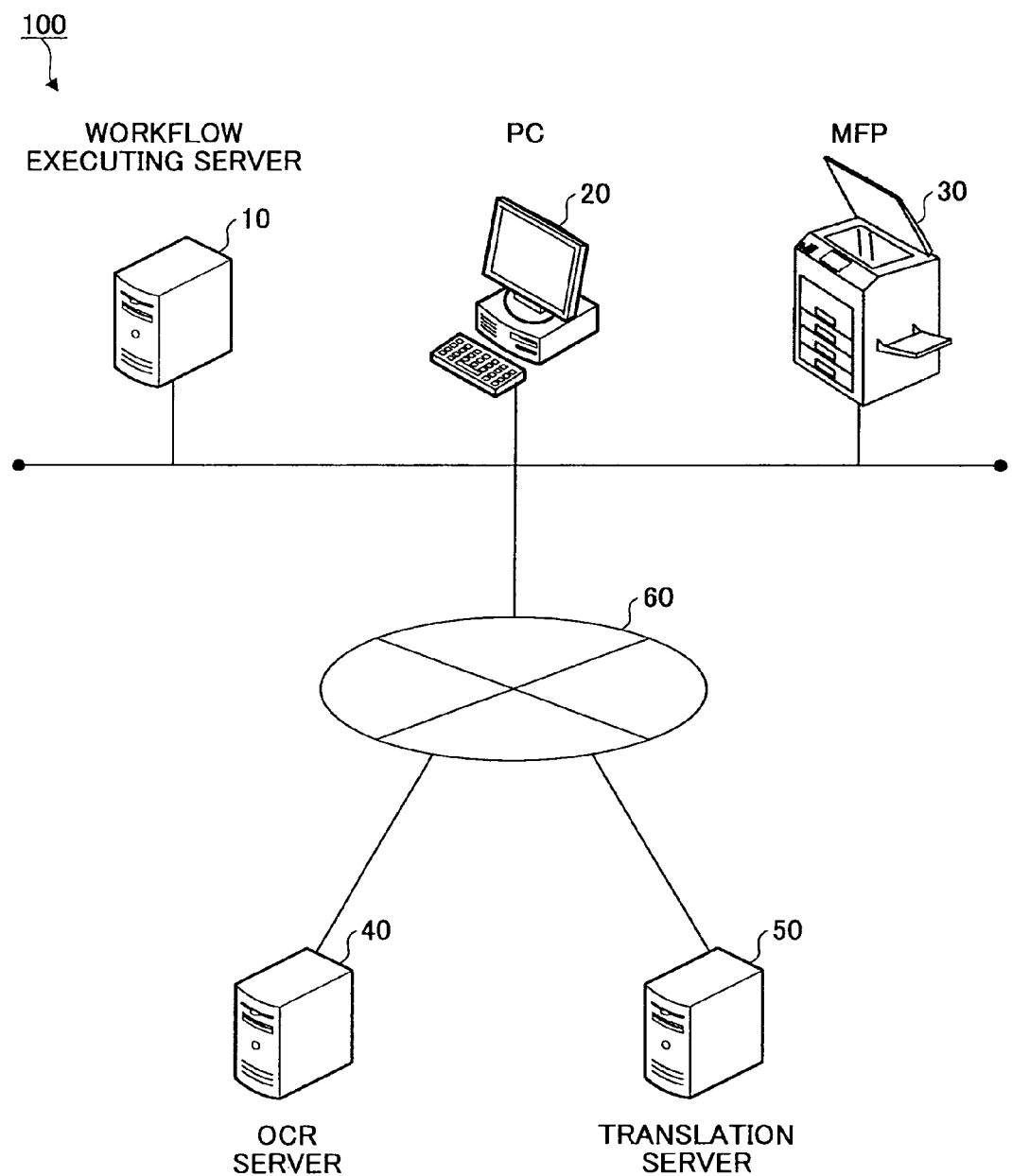
FIG. 1 illustrates a network configuration according town embodiment.

First, the overall configuration for implementing an embodiment of the present invention is described before giving the details. FIG. 1 illustrates a network configuration according to the present embodiment. As shown in FIG. 1, a workflow executing server 10, a PC (personal computer) 20, an MFP (multifunction peripheral) 30, an OCR (Optical Character Recognition) server 40, and a translation server 50 are connected to a network 60.

The workflow executing server 10 receives instructions from the PC 20 of a user, combines services provided from service providers in the network 60, and constructs and executes a combination of the services as a sequence of a workflow. In the workflow according to the present embodiment, an OCR process, a translation process, an image process, and then a printing process are executed on document data (including image areas and character image areas) input from the PC 20.

The PC 20 instructs the workflow executing server 10 to execute a process. For example, when a user operates the PC 20 to access the workflow executing server 10, a process menu indicating processes that can be provided is displayed, and the user selects one or more processes from the process menu. When a process includes plural processes, the user specifies the order of the processes and detailed settings (for example, parameters) before instructing to execute the process.

The MFP 30 is an image forming apparatus in which functions of respective devices such as a fax machine, a printer, a copier, and a scanner are accommodated in a single body. The MFP 30 includes a display unit, a printing unit, and an imaging unit in a single body, and includes four types of applications corresponding to a fax machine, a printer, a copier, and a scanner. The MFP 30 switches the application to be implemented among the four applications, to operate as a fax machine, a printer, a copier, or a scanner. In the present embodiment, the MFP 30 acts as a service providing unit, and executes an image process and a printing process on the input data in the above-described workflow.

The OCR server 40 scans a document image by optical character recognition (OCR), and converts the data of the document image into a text format that can be edited by a computer. A conventional OCR technology may be used. In the present embodiment, the OCR server 40 acts as a service providing unit, and executes an OCR process on the input data in the above-described workflow.

The translation server 50 is for reading the input data (text) and translating/converting the data into a specified language. A conventional translation technology may be used. In the present embodiment, the translation server 50 acts as a service providing unit, and executes a translation process on the input data in the above-described workflow.

The network 60 includes wired or wireless networks. In the present embodiment, the workflow executing server 10, the PC 20, and the MFP 30 are connected to the same local area network (LAN) 60. The OCR server 40 and the translation server 50 are external service providers, and are therefore connected to, for example, the Internet 60.

The network configuration of FIG. 1 is merely an example. The elements may be arranged in any other way as long as the elements are connected to a network so that communication can be performed. Furthermore, the MFP 30 may also serve as the workflow executing server 10 according to the present embodiment. In this case, the MFP 30 is treated as a workflow executing server. The MFP 30 can combine together services provided from service providers in the network 60 to construct a workflow and execute a sequence of the workflow. The previews can be viewed on a touch panel of the MFP 30.

Hardware

Figure 2:
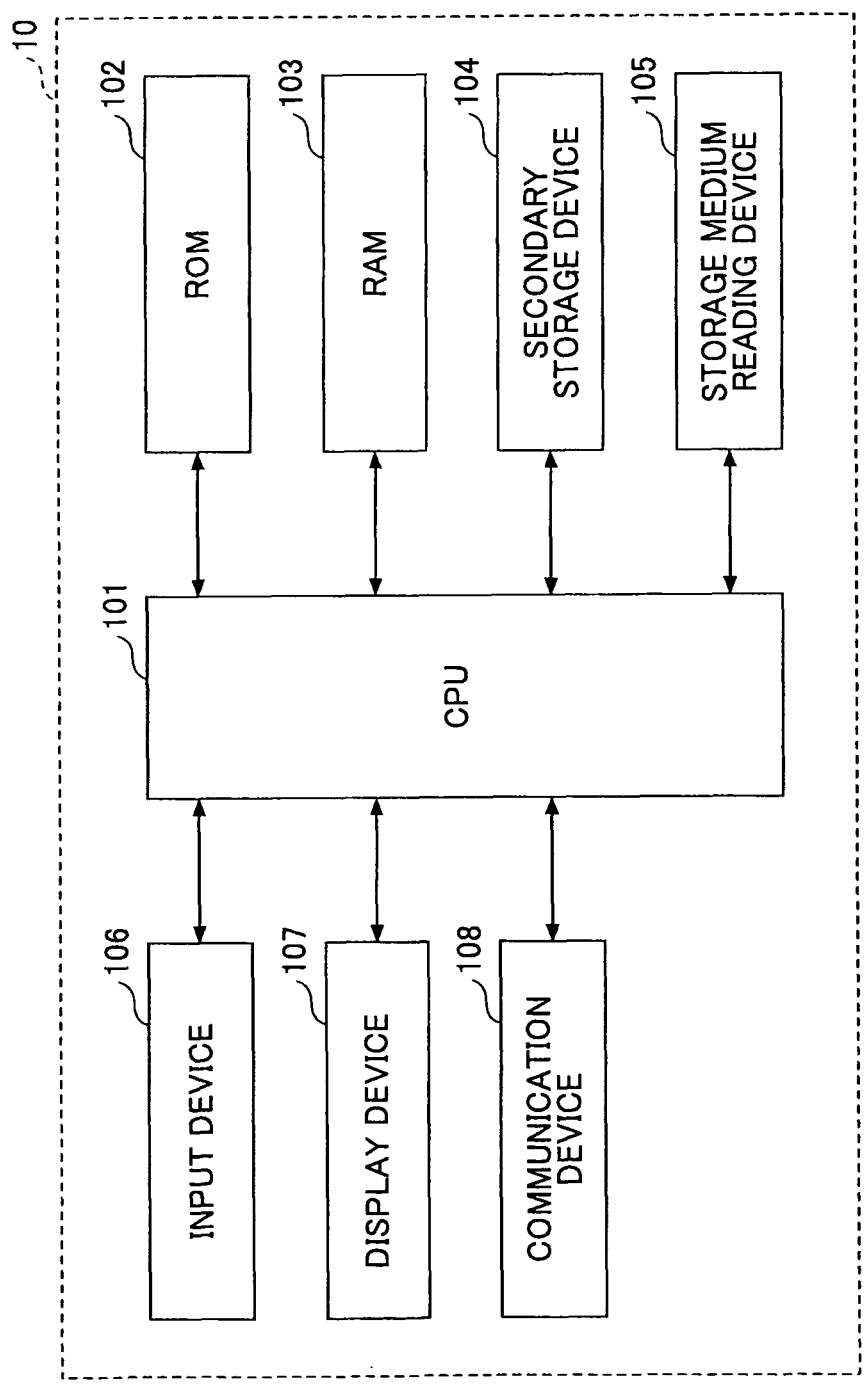
FIG. 2 illustrates a hardware configuration indicating the main elements of a workflow executing server according to an embodiment.

A brief description is given of a hardware configuration of the workflow executing server 10. FIG. 2 illustrates a hardware configuration indicating the main elements of the workflow executing server 10 according to the present embodiment. The main elements in the workflow executing server 10 are a CPU 101, a ROM (Read Only Memory) 102, a RAM (Random Access Memory) 103, a secondary storage device 104, a storage medium reading device 105, an input device 106, a display device 107, and a communication device 108.

The CPU 101 includes a microprocessor and peripheral circuits, and controls the overall workflow executing server 10. The ROM 102 is a memory for storing predetermined control programs (software components) executed by the CPU 101. The RAM 103 is a memory used as a work area when the CPU 101 executes the predetermined control programs (software components) stored in the ROM 102 to perform various control operations.

The secondary storage device 104 is a device for storing a general-purpose OS (Operating System) and various information items including various programs. A nonvolatile storage device such as a HDD (Hard Disk Drive) is used as the secondary storage device 104.

The input device 106 is used by the user to input various operations. The input device 106 includes a mouse, a keyboard, and touch panel switches superposed on a display screen image. The display device 107 is for displaying various data items on a display screen image. For example, the display device 107 includes a LCD (Liquid Crystal Display) and a CRT (Cathode Ray Tube).

The communication device 108 communicates with other devices via the network 60. The communication device 108 supports communications according to various network formats such as a wired network and a wireless network.

Functions

Figure 3:
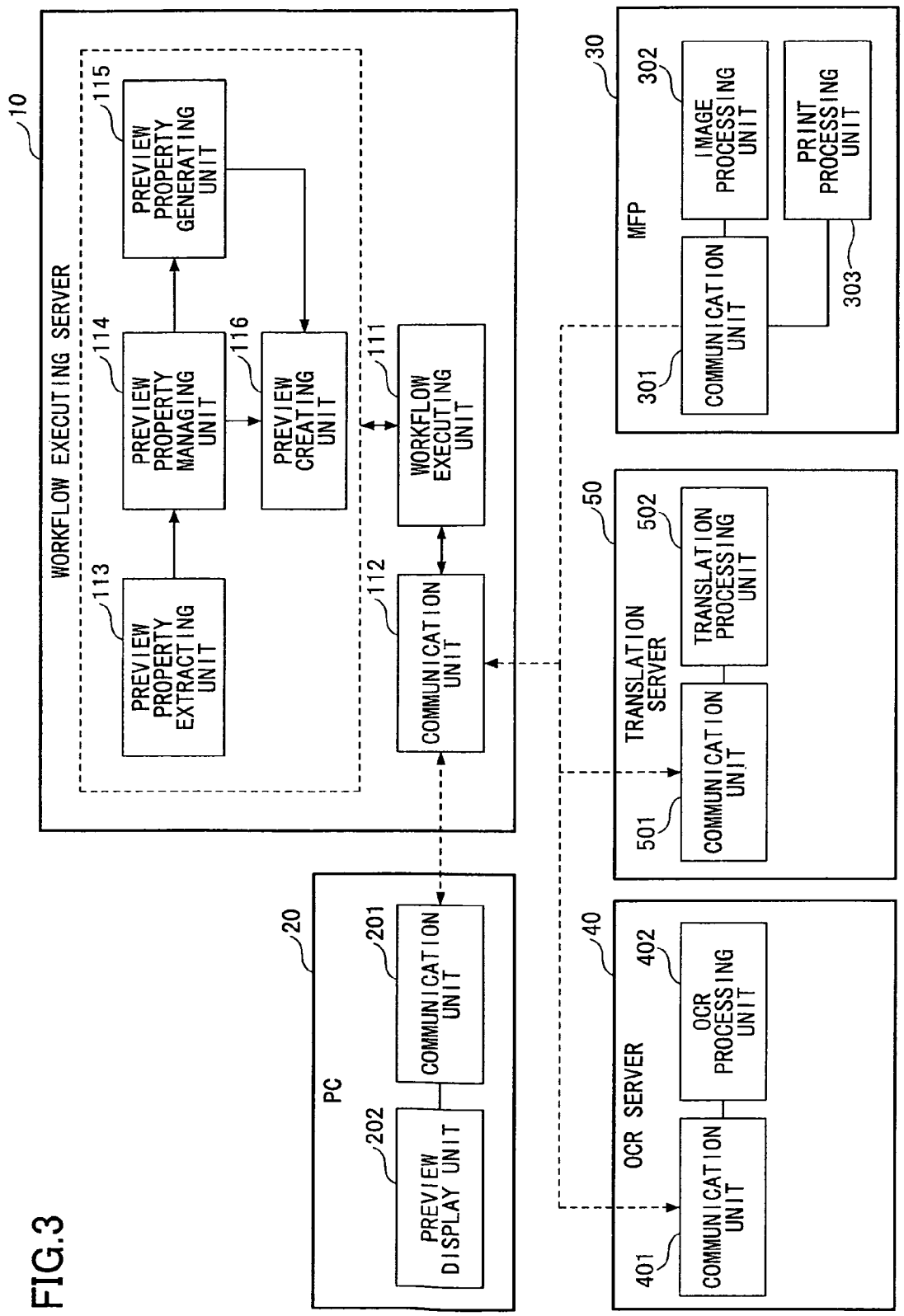
FIG. 3 is a functional block diagram indicating the main functions of the respective devices according to an embodiment.

FIG. 3 is a functional block diagram indicating the main functions of the respective devices according to the present embodiment. In the following, the functions are described in terms of devices.

Workflow Executing Server 10:

The workflow executing server 10 includes a workflow executing unit 111, a communication unit 112, a preview property extracting unit 113, a preview property managing unit 114, a preview property generating unit 115, and a preview creating unit 116.

The workflow executing unit 111 executes a workflow including a combination of plural service providing units such as the MFP 30, the OCR server 40, and the translation server 50. Furthermore, the workflow executing unit 111 has a function of managing and controlling the overall workflow, including the order of executing the services and the service contents (processing contents) to be executed.

The communication unit 112 communicates with other devices via the network 60.

The preview property extracting unit 113 analyzes the input data and the process result data obtained as a result of a process performed on the input data by the service providing unit, and extracts, as preview properties, elements (e.g., contents) constituting the input data (hereinafter, "elements") and the process result data as well as the position information of the elements. Details of the preview properties are given below.

The preview property managing unit 114 manages (stores) the preview properties. Various managing methods are performed such as a style sheet as described below.

The preview property generating unit 115 acquires two preview properties from the preview property managing unit 114. For example, a first preview property is based on input data, and a second preview property is based on process result data obtained by a process performed by a particular service providing unit. A second element, which is the process result obtained by a service providing unit, is inserted in the first preview property in place of a first element that is the processing target of the service providing unit. Then, by associating first position information with the second element, a new preview property is generated. Further details are given below.

The input device 106 creates preview images based on preview properties.

Preview properties are based on the process result data, and therefore preview images reflecting the process result data based on the preview properties can be created.

PC 20:

A communication unit 201 communicates with other devices via the network 60.

A preview display unit 202 displays preview images that are sent from the workflow executing server 10. For example, the preview display unit 202 is implemented by the display device of the PC 20.

MFP 30:

A communication unit 301 communicates with other devices via the network 60.

An image processing unit 302 performs a predetermined image process on input data, in response to a request from a client (the workflow executing server 10 in the present embodiment).

A print processing unit 303 performs a printing process on the input data in response to a request from the client. According to the printing process, an image is transferred onto a sheet, and the sheet is ejected outside.

OCR Server 40:

A communication unit 401 communicates with other devices via the network 60. An OCR processing unit 402 performs an OCR process on input data, in response to a request from a client (the workflow executing server 10 in the present embodiment). The OCR processing unit 402 receives character image data as the input data, and outputs character text data. The OCR processing unit 402 does not process portions of the input data other than the character images.

Translation Server 50:

A communication unit 501 communicates with other devices via the network 60.

A translation processing unit 502 performs a translation process on input data, in response to a request from a client (the workflow executing server 10 in the present embodiment). The translation processing unit 502 receives character text data (in language A) as the input data, and outputs character text data (in language B). The translation processing unit 502 does not process portions of the input data other than the character text.

The above described functional configuration of FIG. 3 indicates the main functions for describing an embodiment of the present invention. The respective devices may have functions other than those described above. Furthermore, the functions described above are actually implemented by computers, as programs are executed by the CPUs of the respective devices.

Information Processing

Overview

Next, a description is given of information processing performed by the workflow executing server 10 according to the present embodiment.

Figure 4:
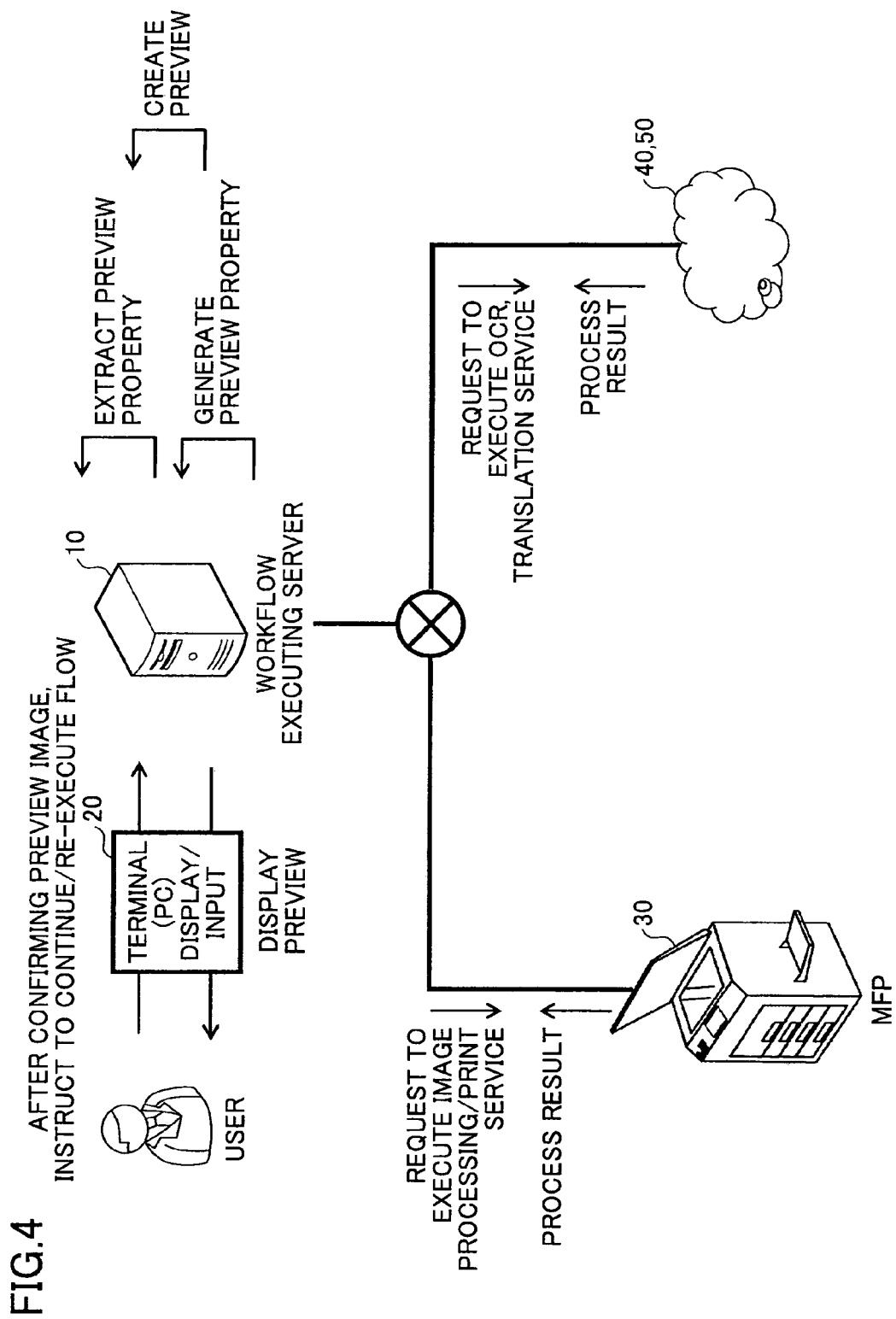
FIG. 4 illustrates an overview of information processing performed by the workflow executing server.
Figure 5:
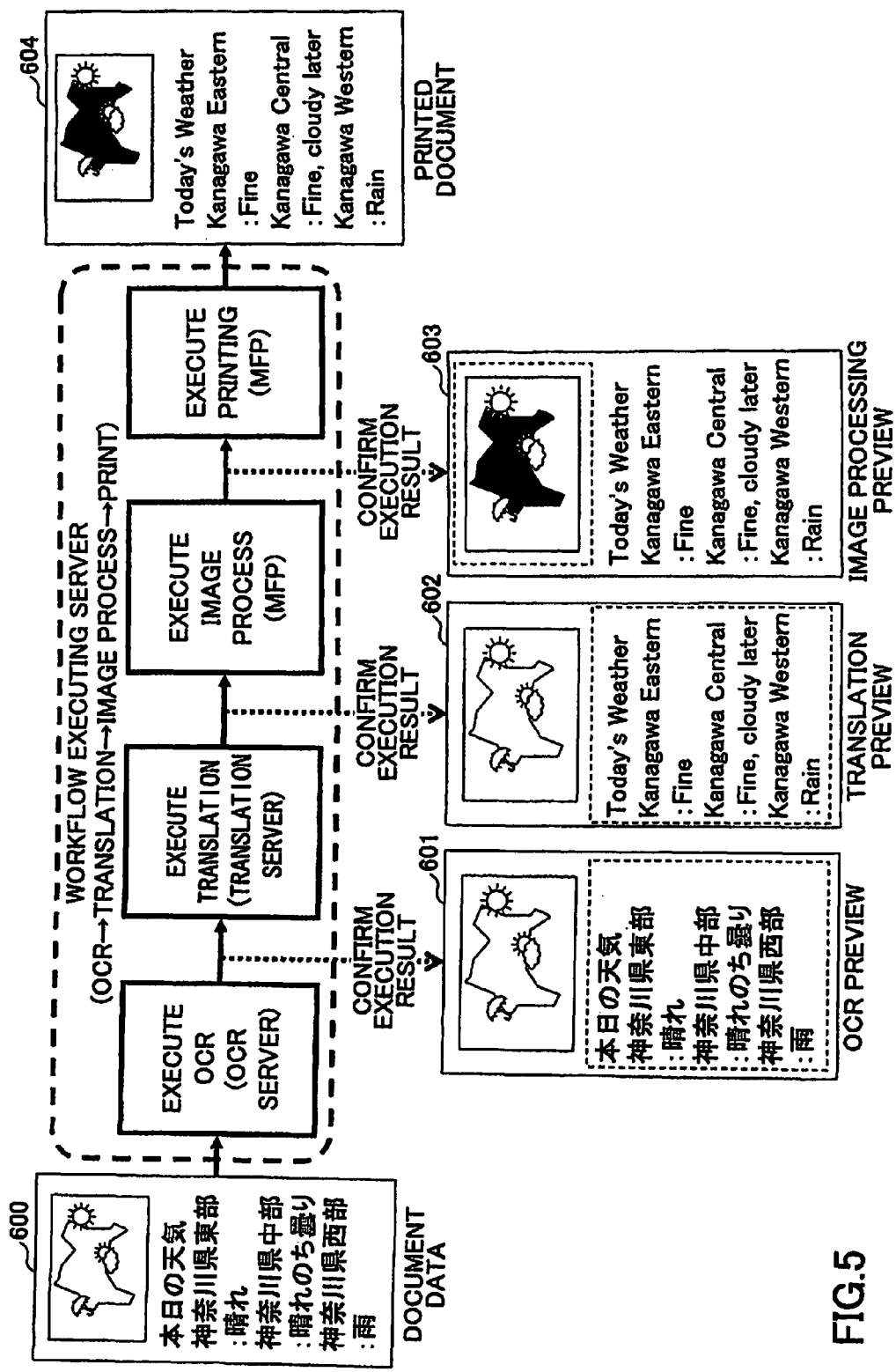
FIG. 5 illustrates an overview of information processing performed by the workflow executing server.

FIGS. 4 and 5 illustrate an overview of information processing performed by the workflow executing server 10. A user gives instructions to execute a workflow to be processed, at the PC 20. From the PC 20, instructions are given to execute an OCR process, a translation process, an image process, and a printing process, as services constituting workflow. The document data (constituted by image areas and character image areas) that is the processing target is input from the PC 20. Furthermore, at the PC 20, the user may specify ranges of character image areas that are targets of the OCR process and character image areas that are targets of the translation process, as detailed settings of the workflow.

Every time a service in the workflow is executed, the workflow executing server 10 creates a preview image and sends the preview image to the PC 20, so that the user can confirm the execution result of each service.

The preview images are used for confirming the execution results (processing contents) of the services, and therefore the execution results (processing contents) need to be reflected in the preview images. However, as the services are provided by various service providers, the execution results (processing contents) returned to the workflow executing server 10 from the respective service providing units and the formats of the preview images may vary.

Accordingly, the workflow executing server 10 according to the present embodiment uses the display format of a certain preview image as a standard, when creating preview images. Other preview images are created to have the same display format as the preview image used as the standard. Specifically, preview properties used as a standard are extracted from the standard preview image. Subsequent preview images are created based on the standard preview properties (details are given below).

For example, as shown in FIG. 5, the user is most familiar with document data 600 that is first input to the PC 20 by the user. Therefore, the display format of the document data 600 is used as the visual standard for the user. Specifically, the subsequent preview images, i.e., an OCR preview 601, a translation preview 602, and an image processing preview 603, are created so that they appear to have the same display format as the input document data 600. Every time a service is executed in the workflow, the user can confirm the execution result of the service in the same display format, and therefore the previews can be easily compared and the process results can be easily confirmed.

Meanwhile, assuming that the translation server 50 is specified to return only the translated portions as the execution result of the translation process, the translation preview 602 will only show the translated portions (i.e., the weather chart will not be displayed). Accordingly, the translation preview 602 will appear to be different from the document data 600 and the OCR preview 601 shown previously. Consequently, it is difficult for the user to compare the previews.

Information Processing

FIGS. 6A and 6B illustrate a sequence for describing information processing performed by the workflow executing server 10 according to the present embodiment. The steps are described with reference to the sequence diagram.

Step S1: The workflow executing unit 111 of the workflow executing server 10 starts to execute the workflow. The workflow executing unit 111 manages/controls the overall workflow, and therefore recognizes the services constituting the workflow that the user has instructed to execute, the order of executing the services, the input data that is the processing target (e.g., the document data 600), and the specified area range that is the processing target.

Step S2: The workflow executing unit 111 requests the preview property extracting unit 113 to extract preview properties from the input document data 600.

Step S3: The preview property extracting unit 113 analyzes the input document data 600, and extracts preview properties from the document data 600. A preview image may be created based on the input data, and preview properties may be extracted from the created preview image.

FIG. 7 illustrates the operation of extracting preview properties. Preview properties are created by analyzing the data, and describing, in a text format, the elements (contents) constituting the data as well as the position information of the elements. That is to say, preview properties are created by replacing information required for creating a preview with descriptions in a text format. Accordingly, a preview image can be created based on the preview properties.

As shown in FIG. 7, preview properties are described by a unique identifier (e.g., ID:S1), an element type such as "image" or "character image" (content type), the position of an element expressed by coordinates, and the contents of the element (content entity is stored in path destination). For example, as a result of analyzing the input data of FIG. 7, it is found that the input data is constituted by two types of elements, i.e., "image" and "character image", and the contents of the elements are located at the positions indicated in FIG. 7.

Figure 8:
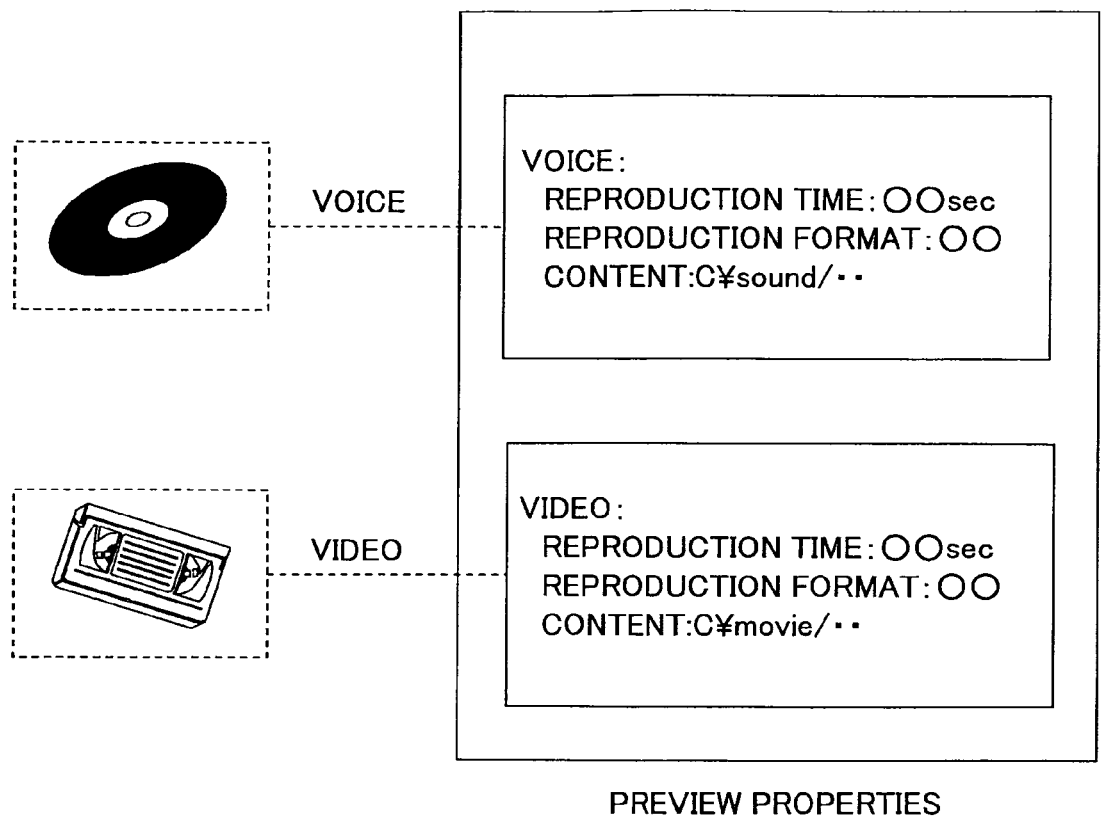
FIG. 8 illustrates the operation of extracting preview properties of voices and videos.

The preview property extracting unit 113 can use a conventional OCR technology and a conventional technology for dividing the areas of images and characters, to extract, as the preview properties, the element type, the position for rendering images, and the contents of the elements. For example, to extract a preview property, a known technology for dividing an image into a character area and an image area (Japanese Laid-Open Patent Publication No. 2006-260304 which is from the same applicant as the instant application) may be used. When the elements include data of voice contents and video contents in addition to images (character images) and characters, the vocal contents and video contents may also be extracted and described as preview properties (see, for example, FIG. 8).

Step S4: When the preview property extracting unit 113 extracts the preview properties of the input document data 600, the preview property extracting unit 113 requests the preview property managing unit 114 to store the preview properties.

Step S5: The preview property managing unit 114 stores the preview properties in response to receive the request to store the preview properties. For the purpose of management, the input data and an identifier of the preview properties (for example, ID:S1) are stored in association with each other to identify the preview properties relevant to the input document data.

Step S6: Next, the workflow executing unit 111 executes OCR, which is the first process included in the workflow. Thus, the workflow executing unit 111 requests the OCR server 40 to execute an OCR process via the communication unit 112. The workflow executing unit 111 also sends the input document data 600, which is the target of processing, to the OCR server 40. When the entire document data 600 is sent, the target range of OCR (character image area) may be specified. Alternatively, only the target range of OCR (character image area) may be cut out from the document data 600 and sent to the OCR server 40.

Step S7: The OCR processing unit 402 of the OCR server 40 receives the request to execute an OCR process from the workflow executing server 10 via the communication unit 401.

Step S8: In accordance with the request to execute an OCR process, the OCR processing unit 402 executes the OCR process. When the execution is completed, the OCR processing unit 402 returns the process result to the workflow executing server 10. The process result is an OCR process result, and is thus expressed as text data. The OCR server 40 may return the entire document data 600 including the portion converted to text data by the OCR process, or may return only the text data that is the OCR process result (that is to say, the OCR process result depends on the specification of the OCR server 40).

Step S9: The workflow executing unit 111 sends the OCR process result to the preview property generating unit 115, and requests the preview property generating unit 115 to generate preview properties after OCR processing. The target for which preview properties are generated is the OCR process result data.

Step S10: The preview property generating unit 115 requests the preview property managing unit 114 to acquire preview properties of the input document data 600 that have been stored. Specifically, the preview property generating unit 115 acquires the preview properties corresponding to the identifier ID:S1.

Step S11: The preview property generating unit 115 generates preview properties after OCR processing (identifier ID:S2) based on the preview properties of the identifier ID:S1 acquired at step S10 and the OCR process result acquired at step S9.

Figure 9:
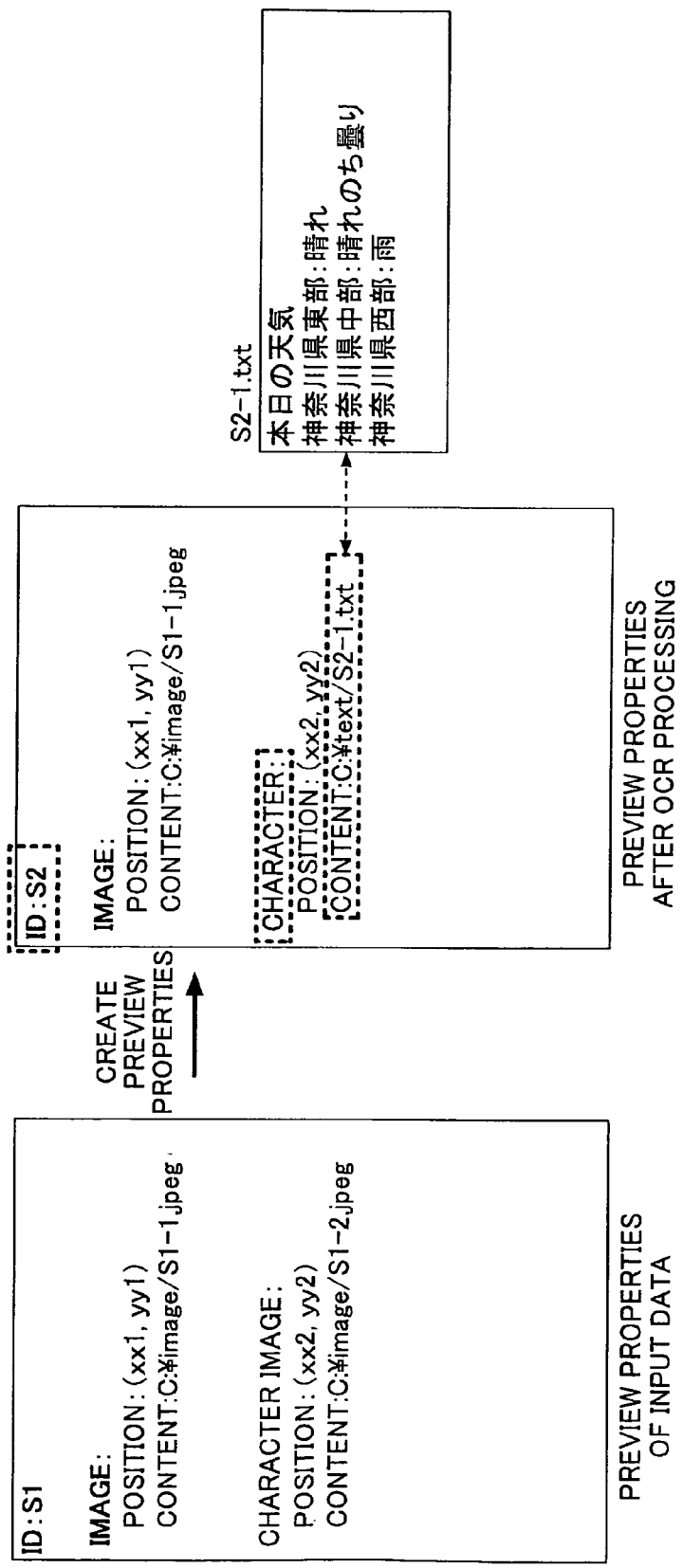
FIG. 9 illustrates the operation of generating preview properties (part 1)

FIG. 9 illustrates the operation of generating preview properties (part 1). The operation of generating preview properties after OCR processing, is performed by replacing the elements (contents) that are the OCR processing target among the preview properties before OCR processing with the elements (contents) relevant to the OCR process result corresponding to the OCR processing target. Specifically, first, a framework for preview properties after OCR processing is generated by copying the preview properties (ID:S1) of the input data and rewriting the ID to S2.

At this time, the OCR server 40 has performed an OCR process on the contents of the character image among the preview properties of the input data. Therefore, in the preview properties after OCR processing (ID:S2), the element type is rewritten to character from character image, and the information of the path destination of the contents is rewritten. That is to say, the contents are rewritten from data before OCR processing (C:¥image/S1-2.jpeg) to data after OCR processing (C:¥image/S2-1.txt).

In the preview properties after OCR processing (ID:S2), the contents after OCR processing are rewritten to "C:¥image/S2-1.txt", but the position remains at (xx2, yy2). That is to say, by rewriting the contents, the contents "C:¥image/S2-1.txt" are associated with the position (xx2, yy2). By creating the preview based on these preview properties, the OCR process result is reflected in the preview, but the position of the OCR process result is (xx2, yy2), and therefore the overall appearance appears to be the same as the input document data 600 (see document data 600 and OCR preview 601 in FIG. 5).

Step S12: The preview property generating unit 115 requests the preview property managing unit 114 to store the preview properties after OCR processing of the identifier ID:S2 that are newly generated. For the purpose of management, the preview property generating unit 115 manages the OCR process results and the identifier (ID:S2) of the preview properties in association with each other to identify that the preview properties are preview properties after OCR processing.

Step S13: Next, the workflow executing unit 111 requests the preview creating unit 116 to create a preview after OCR processing. The preview after OCR processing is created for presenting a preview to the user at the point of time when execution of the OCR that is the first process of the workflow is completed.

Step S14: The preview creating unit 116 requests the preview property managing unit 114 to acquire preview properties after OCR processing that have been stored. Specifically, the preview property managing unit 114 acquires the preview properties of the identifier ID:S2.

Step S15: The preview creating unit 116 creates the preview image after OCR processing (OCR preview 601). The preview properties after OCR processing (ID:S2) is indicated in FIG. 9. As described above, the preview properties are described by rewriting information required for creating a preview into a text format, and therefore a preview image can be created based on the preview properties. The created preview image after OCR processing is returned to the workflow executing unit 111.

Step S16: The workflow executing unit 111 sends the preview image after OCR processing to the PC 20 via the communication unit 112. The purpose of doing so is to present this preview to the user on the PC 20.

Step S17: When the preview image after OCR processing is received, the preview display unit 202 of the PC 20 displays the OCR preview 601 to the user. As shown in the OCR preview 601 of FIG. 5, the OCR preview 601 is displayed in the same manner and the same format as the input document data 600. By confirming the OCR preview 601 after OCR processing, the user can confirm whether the OCR processing step in the workflow has been normally completed. Assuming that a failure has occurred (such as character corruption), the user can easily notice where a failure has occurred by comparing the OCR preview 601 after OCR processing with the document data 600.

The preview is displayed as above because the preview properties (ID:S2) of the OCR preview 601 are generated based on the preview properties (ID:S1) of the document data 600, and the OCR preview 601 is created based on the preview properties (ID:S2) of the OCR preview 601. That is to say, in the preview properties of ID:S2, although the data after OCR processing is rewritten as "C:¥image/S2-1.txt", the position is unchanged at (xx2, yy2). Therefore, although the OCR process result is reflected, the overall appearance is similar to the input document data.

Next, after executing the OCR process, the workflow executing unit 111 executes the translation process, the image process, and the print process. These processes may be executed similarly to the OCR process by performing steps S6 through S17 (not further described), and the document data 604 that is finally input is printed and ejected from the MFP 30. As to the translation process and the image process, operation of generated preview properties are described below.

Figure 10:
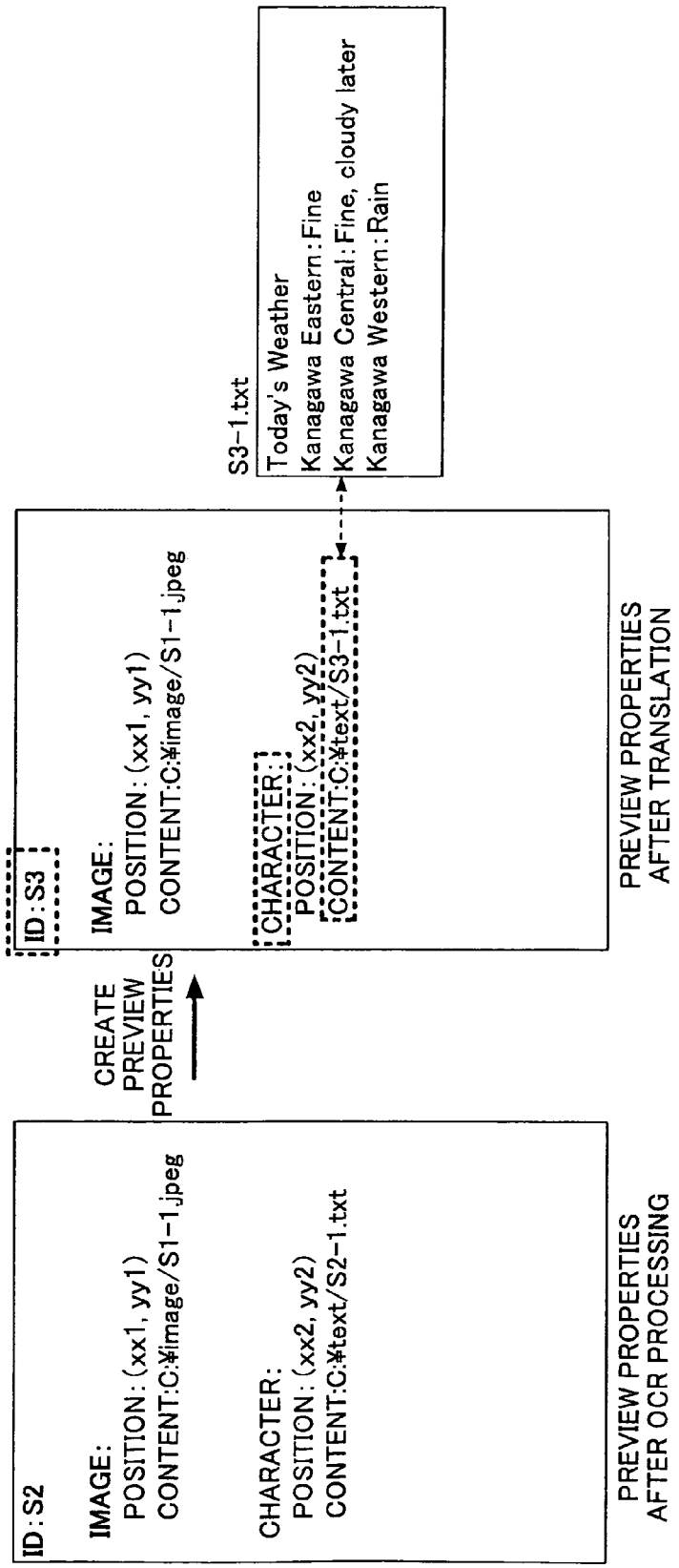
FIG. 10 illustrates the operation of generating preview properties (part 2)

FIG. 10 illustrates the operation of generating preview properties (part 2). When a translation process result is acquired from the translation server 50, the workflow executing server 10 generates preview properties after translation (ID:S3) based on the preview properties after OCR processing (ID:S2) that have been previously saved, and creates a preview image after translation based on the generated preview properties after translation. Then, the preview image after translation is sent to the PC 20 to display a preview to the user.

As shown in the translation preview 602 of FIG. 5, the translation preview 602 is displayed in the same manner and the same format as the input document data 600 and the OCR preview 601 previously created. By confirming the translation preview 602 after translation processing, the user can confirm whether the translation processing step in the workflow has been normally completed.

Figure 11:
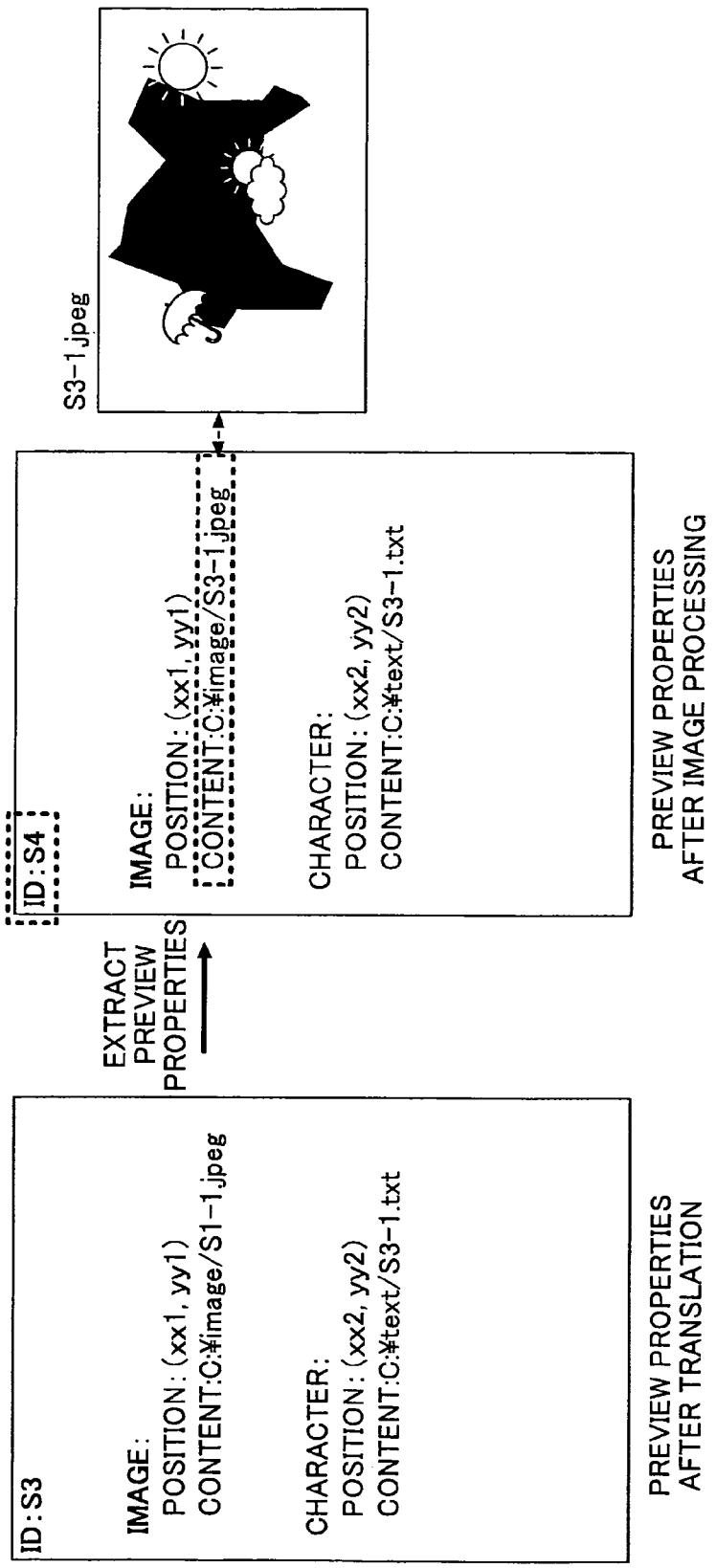
FIG. 11 illustrates the operation of generating preview properties (part 3)

FIG. 11 illustrates the operation of generating preview properties (part 3). When an image process result is acquired from the MFP 30, the workflow executing server 10 generates preview properties after image processing (ID:S4) based on the preview properties after translation (ID:S3) that have been previously saved, and creates a preview image after image processing based on the generated preview properties after image processing. Then, the preview image after image processing is sent to the PC 20 to display a preview to the user.

As shown in the image processing preview 603 of FIG. 5, the image processing preview 603 is displayed in the same manner and the same format as the input document data 600, the OCR preview 601, and the translation preview 602 previously created. By confirming the image processing preview 603 after image processing, the user can confirm whether the image processing step in the workflow has been normally completed.

Example of Saved Preview Properties

FIG. 12 illustrates a specific example of saved preview properties in a style sheet. FIG. 12 indicates the preview properties of ID:S2 (FIG. 9) taken as an example and described in a style sheet. The preview properties in a style sheet are saved and managed by the preview property managing unit 114. By saving the preview properties in a style sheet, the saving properties may be improved and reading speed may be increased.

The style sheet of FIG. 12 includes a <strong> tag. The portion in the <strong> tag is to be displayed in a highlighted manner in the preview display. When a particular service executing unit ends the execution and creates a preview associated with a preview created by the previous service executing unit, there are portions that have been changed (processed) from the preview created by the previous service executing unit. The changed portions can be clearly indicated by using bold letters and colored dashed lines, so that the changed (processed) portions are clear to the user. Referring back to FIG. 5, it is shown in the OCR preview 601, the translation preview 602, and the image processing preview 603 that the respective service executing units have highlighted the processed portions with dashed lines.

Supplement

In the above embodiments, the input data that is the processing target of the workflow is document data (electronic data), and the preview properties are first extracted from the document data. The document data 600 that is first input by the user is most familiar to the user, and therefore the display format of the document data 600 is used as a visual standard for the user.

However, if the input data is an original document (paper medium), the document needs to be scanned by the MFP 30 and converted into electronic data. In this case, the above workflow includes a scanning process, an OCR process, a translation process, an image process, and a printing process. The preview properties used as a standard are to be extracted from process result data obtained as a result of performing the scanning process. Furthermore, in order to display a preview after scanning to the user, a preview image after scanning is created based on preview, properties after scanning. The preview image after scanning is sent to the PC 20 to be displayed.

Next, when an OCR process is performed on the electronic data obtained by the scanning process, preview properties after OCR processing are generated based on the OCR process result and the preview properties after scanning, and then a preview image after OCR processing is created. The preview image after OCR processing is also sent to the PC 20 and displayed. The user can easily confirm the scanning process result and the OCR process result by comparing the preview after scanning and the preview after OCR processing.

Review

There are conventional workflow executing systems where plural services provided in a network are combined together to construct and execute a workflow. With the conventional preview function for viewing results of the service executing units provided in the network, the respective service executing units display previews by different methods (formats). However, with the workflow executing server 10 according to the present embodiment, preview properties used as a standard are extracted from a certain set of data, and preview images for subsequent previews are created in accordance with the display format of the same standard preview properties. Accordingly, when the user wants to confirm the process results of the service executing units in the workflow every time a process is completed, the user can easily compare the previews and confirm the respective process results by comparing the previews created by the respective service executing units.

That is to say, with the workflow executing device according to the present embodiment, in a workflow that is implemented by combining plural service executing units provided by different providers, the display formats of the previews created based on execution results of the service executing units can be unified, and therefore the respective execution results can be easily confirmed.

A structure in which elements, expressions, or an arbitrary combination of elements disclosed in the present application is applied to a method, an apparatus, a system, a computer program, or a recording medium is also effective as another embodiment of the present invention.

The present invention is not limited to the specific embodiments described herein, and variations and modifications may be made without departing from the scope of the present invention.

The present application is based on Japanese Priority Patent Application No. 2010-234869, filed on Oct. 19, 2010, the entire contents of which are hereby incorporated herein by reference.

What is claimed is:

1. A workflow executing device connected to plural service providing units via a network, the workflow executing device comprising:
a workflow executing unit configured to execute a workflow including a combination of processes provided by the plural service providing units;
a receiving unit configured to receive a first data item;
a first data generating unit configured to generate first identification information for uniquely identifying the first data item received at the receiving unit;
a first preview property extracting unit configured to extract, as a first preview property from the first data item, an element including position information of an image configuration of the first data item;
a second data generating unit configured to generate second identification information for uniquely identifying a second data item obtained as a result of the first data item being processed by the plural service providing units;
a second preview property extracting unit configured to extract, as a second preview property, an element including position information of an image configuration of the second data item based on the second data item and the first preview property stored in association with the first identification information;
a preview property managing unit configured to manage preview properties by storing, in association with each other, the first identification information generated by the first data generating unit and the first preview property extracted by the first preview property extracting unit, and storing, in association with each other, the second identification information generated by the second data generating unit and the second preview property extracted by the second preview property extracting unit; and
a preview creating unit configured to create preview images based on the first and second preview properties respectively associated with the first and second identification information, based on the first and second identification information respectively generated by the first and second data generating units and stored in the preview property managing unit.

2. The workflow executing device according to claim 1, further comprising:
a third preview property extracting unit configured to analyze a third data item obtained as a result of the second data item being processed by the plural service providing units, and extract a third preview property from the third data item, the third preview property including a third element constituting the third data item and third position information of the third element.

3. The workflow executing device according to claim 1, wherein
the first element constituting the first data item and the second element constituting the second data item are any one of an image content, a character content, a voice content, and a video content.

4. The workflow executing device according to claim 1, wherein
the preview property managing unit manages preview properties with the use of a style sheet.

5. A preview creating method performed by a workflow executing device connected to plural service providing units via a network, the workflow executing device including a workflow executing unit that executes a workflow including a combination of processes provided by the plural service providing units, the preview creating method comprising:
receiving a first data item;
generating first identification information for uniquely identifying the first data item;
analyzing a first data item;
extracting, as a first preview property from the first data item, an element including position information of an image configuration of the first data item;
generate second identification information for uniquely identifying a second data item obtained as a result of the first data item being processed by the plural service providing units;
extracting, as a second preview property, an element including position information of an image configuration of the second data item based on the second data item and the first preview property stored in association with the first identification information;
managing preview properties by storing, in association with each other, the first identification information generated by the first data generating unit and the first preview property extracted by the first preview property extracting unit, and storing, in association with each other, the second identification information generated by the second data generating unit and the second preview property extracted by the second preview property extracting unit;
and
creating preview images based on the first and second preview properties respectively associated with the first and second identification information, based on the first and second identification information respectively generated by the first and second data generating units and stored in the preview property managing unit.

6. A non-transitory computer-readable storage medium with an executable program stored therein, wherein the program instructs a processor of a computer to execute the preview creating method according to claim 5.

* * * * *